(12) United States Patent
Nohara et al.

(10) Patent No.: US 6,525,121 B1
(45) Date of Patent: Feb. 25, 2003

(54) RUBBER COMPOSITION

(75) Inventors: Daisuke Nohara, Kodaira (JP); Susumu Kusakawa, Yokkaichi (JP); Seizo Saito, Kawagoe (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/487,730

(22) Filed: Jan. 19, 2000

(30) Foreign Application Priority Data

Jan. 21, 1999 (JP) .......................................... 11-013550

(51) Int. Cl.⁷ ................................................. C08K 5/10
(52) U.S. Cl. ....................................... 524/315; 524/318
(58) Field of Search .................................. 524/318, 315

(56) References Cited

U.S. PATENT DOCUMENTS

| 4,788,241 A | 11/1988 | Cornell et al. ............... 524/311 |
| 5,252,650 A | 10/1993 | Wideman et al. ........... 524/318 |

FOREIGN PATENT DOCUMENTS

| EP | 0 849 316 A1 | 6/1998 |
| JP | 57-168998 | 10/1982 |
| JP | 59-113044 | 6/1984 |
| JP | 59-122532 | 7/1984 |
| JP | 62-064842 | 3/1987 |
| JP | 62-72733 | 4/1987 |

OTHER PUBLICATIONS

European Search Report dated Apr. 24, 2000.

*Primary Examiner*—Peter D. Mulcahy
(74) *Attorney, Agent, or Firm*—Sughrue Mion, PLLC

(57) ABSTRACT

A rubber composition containing, per 100 parts by weight of a vulcanizable rubber component, 0.2 to 20 parts by weight of an ester compound obtained by a reaction of alcohols with a fatty acid having a conjugated linoleic acid content of 40% by weight or more, which is markedly excellent in processability in the unvulcanized state and which has an excellent low heat-generating property without deteriorating mechanical properties after vulcanization and is excellent in adhesion between steel and vulcanized rubber.

4 Claims, No Drawings

RUBBER COMPOSITION

BACKGROUND OF THE INVENTION

1. Field of the Invention

The present invention relates to a rubber composition which contains a fatty acid ester and is improved in processability without deteriorating mechanical properties after vulcanization. Further, the present invention relates to a rubber composition which is excellent in adhesion between vulcanized rubber and steel and the like without deteriorating mechanical properties after vulcanization and which has good processability.

2. Description of the Related Art

In recent years, a rubber composition for a tire is notably deteriorated in processability of unvulcanized rubber in compensation for satisfying desirable performances as a tire over a wide range.

In general, it is known that a process oil is blended into rubber for the purpose of providing diene base rubber with plasticity to improve processability.

However, involved in this method is a problem that while unvulcanized rubber can be improved in processability, vulcanized rubber is reduced in mechanical properties and the like.

On the other hand, known are rubber compositions containing fatty acids and various metal salts of fatty acids as processing aids (Japanese Patent Application Laid-Open No. Sho 62-64842 and Japanese Patent Application Laid-Open No. Sho 59-113044, etc.). They can be expected to improve the processability but have problems in that the mechanical properties after vulcanization are reduced in terms of the use of tires and that durability in adhesion between a steel cord and vulcanized rubber is deteriorated so that they can not be used for the circumference of a steel cord and are restricted in use.

Further, used as processing aids are various esters, for example, pentaerythritol tetrastearate (Japanese Patent Application Laid-Open No. Hei 1-115943), monoglycerides, rice bran wax and paraffin wax. While they can be expected to improve the processability, they have a problem of blooming or bleeding in vulcanized rubber.

Esters of a polymer acid or an alkenylsuccinic acid with a higher alcohol or a polyhydric alcohol are disclosed in Japanese Patent Application Laid-Open No. Sho 62-72733 as an ester base processing aid which solves these problems, but they reduce the mechanical properties after vulcanization and have a problem of durability in adhesion between steel and vulcanized rubber.

Further, a processing aid which is a mixture of a diester of aliphatic alcohol having a melting point of 10° C. or lower with an organic acid, and a fatty acid is disclosed in Japanese Patent Application Laid-Open No. Sho 57-168998, but this reduces as well the mechanical properties after vulcanization and has a problem of durability in adhesion between steel and vulcanized rubber. Further, found are no descriptions on the effect of adding respective components contained in the processing aids in the form of a simple substance to a rubber composition.

Further, esters of an unsaturated fatty acid with a saturated or unsaturated alcohol or glycol are disclosed in Japanese Patent Application Laid-Open No. Sho 59-122532 as an agent to improve resistance to low temperature of a rubber composition. This agent can improve flexibility of the rubber composition but the rubber composition containing the agent has a problem that it is inferior in a low heat-generating property, strength and an adhesion property to a steel cord.

As described above, the existing situation is that respective conventional rubber compositions which are improved in processability have the problems that the physical properties such as mechanical properties and a low heat-generating property are largely reduced and the adhesion between steel and vulcanized rubber is deteriorated, and a rubber composition which is improved in these problems and has good processability is desired.

SUMMARY OF THE INVENTION

In light of the problems on the conventional techniques described above and the existing situation, the present invention is intended solving them, and an object thereof is to provide a rubber composition which is excellent in processability in the unvulcanized state and has an excellent low heat-generating property without deteriorating mechanical properties after vulcanization and which is excellent in adhesion between steel and vulcanized rubber.

Intensive investigations of the problems described above continued by the present inventors have resulted in finding that a rubber composition which is blended with a specific ester compound is notably excellent in processability in the unvulcanized state and has an excellent low heat-generating property without deteriorating mechanical properties after vulcanization and that it is excellent as well in adhesion between steel and vulcanized rubber, and thus the present invention has been completed.

That is, the rubber composition of the present invention which has good processability comprises the following items (1) to (3):

(1) A rubber composition characterized by comprising, per 100 parts by weight of a vulcanizable rubber component, 0.2 to 20 parts by weight of an ester compound obtained by a reaction of an alcohol with a fatty acid having a conjugated linoleic acid content of 40% by weight or more.

(2) The rubber composition as described in the above item (1), wherein the alcohol contains 60% by weight or more of monohydric alcohol and/or dihydric alcohol.

(3) The rubber composition as described in the above item (1) or (2), wherein the ester compound has a viscosity of 140 mPa·s or less at 25° C.

DETAILED DESCRIPTION OF THE PREFERRED EMBODIMENTS

The embodiments of the present invention shall be explained below in detail.

The rubber composition of the present invention is characterized by containing, per 100 parts by weight of a vulcanizable rubber component, 0.2 to 20 parts by weight of an ester compound obtained by a reaction of an alcohol with a fatty acid having a conjugated linoleic acid content of 40% by weight or more.

The rubber component used in the present invention shall not specifically be restricted as long as it is vulcanizable rubber and, for example, natural rubber (NR), styrene-butadiene rubber (SBR), polybutadiene rubber (BR) and isoprene rubber (IR) can be used alone or in combination of two or more kinds thereof.

The ester compound used in the present invention is obtained by esterification of a fatty acid having a conjugated linoleic acid content of 40% by weight or more with an alcohol.

The esterification can be carried out by a dehydration reaction of a fatty acid with an alcohol.

The fatty acid having a conjugated linoleic acid content of 40% by weight or more, which is the raw material, can be obtained primarily by the following processes (1) to (3):
  (1) A process for producing dehydrated castor oil fatty acid by a dehydration reaction of castor oil fatty acid.
  (2) Modification to dehydrated castor oil fatty acid by a saponification decomposition of dehydrated castor oil.
  (3) Conjugation isomerization of a fat and oil having a high linoleic acid content such as safflower oil or the fatty acid thereof.

The fatty acid having a conjugated linoleic acid content of 40% by weight or more can be obtained by the processes (1) to (3) described above, but the process for obtaining the fatty acid shall not be restricted to these processes.

In the present invention, any fatty acids can be used without specific restrictions as long as they are fatty acids having a conjugated linoleic acid content of 40% by weight or more, but fatty acids having a conjugated linoleic acid content of 45% by weight or more are preferred from a viewpoint of elevating reactivity with a polymer via sulfur.

The fatty acids having a conjugated linoleic acid content of less than 40% by weight reduce the reactivity described above, which in turn leads to bleeding and a reduction in the physical properties of vulcanized rubber, and therefore they are not preferred.

The alcohols which can be used in the present invention include monohydric alcohols, dihydric alcohols and polyhydric alcohols of trihydric or higher alcohols. In order to obtain the ester compounds having a low viscosity, monohydric alcohols or dihydric alcohols or mixtures thereof are suited.

Particularly preferably, monohydric alcohols or dihydric alcohols or mixtures thereof account for 60 a by weight or more of the alcohols used.

Polyhydric alcohols of trihydric or higher alcohols can be used in combination within a range where the resulting ester compound has a viscosity which does not exceed 140 mPa·s at 25° C.

There can be used as the monohydric alcohol, for example, methyl alcohol, ethyl alcohol, isopropyl alcohol, butyl alcohol, isobutyl alcohol, t-butyl alcohol, amyl alcohol, isoamyl alcohol, octyl alcohol, lauryl alcohol, benzyl alcohol, 2-ethylhexyl alcohol, oleyl alcohol, isostearyl alcohol, furfuryl alcohol and terpene alcohols.

There can be used as the dihydric alcohol, for example, ethylene glycol, propylene glycol, butylene glycol, hexylene glycol, diethylene glycol, neopentyl glycol and N-methyldiethanolamine.

For example, trimethylolpropane can be used as the trihydric alcohol.

The viscosity of the ester compound comprising the fatty acid having a conjugated linoleic acid content of 40% by weight or more and an alcohol in the present invention varys depending on the kinds of the fatty acid and the alcohol used, and it should be low [5 to 200 mPa·s at 25° C.] preferably 140 mPa·s or less at 25° C., more preferably 5 to 100 mPa·s at 25° C. from a viewpoint of a reduction in the viscosity of unvulcanized rubber after blended with the ester compound.

The blending amount of the ester compound is 0.2 to 20 parts by weight, preferably 0.5 to 5 parts by weight per 100 parts by weight of the vulcanizable rubber component described above.

If the blending amount is less than 0.2 part by weight, improvement in the processability is less likely to be expected. On the other hand, if it exceeds 20 parts by weight, the physical properties of the rubber tend to be reduced, and it is not preferred from a viewpoint of the cost.

Further, the rubber composition of the present invention is preferably compounded with a reinforcing agent. The reinforcing agent shall not specifically be restricted, and those which are generally used for rubber can be applied. Included are, for example, carbon black such as HAF, ISAF and SAF, or white fillers such as silica and aluminum hydroxide.

Further, the rubber composition of the present invention can suitably be blended, if necessary, with other rubber compounding ingredients which are generally used in the rubber industry, for example, sulfur, a vulcanization accelerator, a process oil and an antioxidant.

The blending amounts of the reinforcing agents and the rubber compounding ingredients described above shall suitably be determined respectively within the ranges where the effects of the present invention are not damaged.

The ester compound in the present invention can reduce the viscosity of the rubber composition and elevate the fluidity thereof by blending with the other raw materials (the rubber component, the reinforcing agent, the rubber compounding ingredients and the like). Further, it has a hydrophilic group (ester group) and a lipophilic group (fatty acid) in a molecule, so that the hydrophilic group adsorbs on the surface of the reinforcing agent and the lipophilic group is compatible with rubber, whereby interaction between the reinforcing agent and the rubber in the unvalcanized state is reduced. As a result, the rubber composition is improved in processability and the reinforcing agent can be dispersed well.

Further, the ester compound of the present invention can react with the polymer via sulfur during vulcanization, so that the mechanical properties of vulcanized rubber are not deteriorated, and blooming or bleeding are less liable to take place.

The rubber composition of the present invention is obtained by kneading the rubber component, the ester compound, the reinforcing agent and the rubber compounding ingredients each described above by means of a mixer such as a roll, a kneader and a banbury mixer, then mold-processed, and vulcanized. It can be used for tire use such as a tire tread, a carcass, a belt, a side wall and a bead part, rubber for a conveyor belt, and other various industrial rubbers.

In particular, the rubber composition of the present invention is, as described above, markedly excellent in processability in the unvulcanized state and has an excellent low heat-generating property without deteriorating the mechanical properties after vulcanization. Further, it is excellent as well in adhesion between steel and vulcanized rubber, and therefore it is suitably used for tire use such as a carcass, a belt, a bead part and the like.

Further, in order to improve the adhesion to steel, it is effectively blended with an adhesive such as a cobalt salt of an organic acid or an inorganic salt hydrate in an amount of, for example, 0.7 to 1.0 part by weight.

EXAMPLES

The present invention shall be explained below in further details with reference to examples and comparative examples, but the present invention shall not be restricted to the following examples.

Examples 1 to 9 and Comparative Examples 1 to 6

Rubber compositions were prepared in the respective blending formations using ester compounds A to K obtained by reacting fatty acids having various conjugated linoleic acid contents with various alcohols shown in the following Table 1, and natural rubber and polybutadiene rubber as vulcanizable rubber components.

Examples 10 to 18 and Comparative Examples 7 to 12

Rubber compositions were prepared in the respective blending formations shown in the following Table 2 using ester compounds A to K obtained by reacting fatty acids having various conjugated linoleic acid contents with various alcohols, and natural rubber as a vulcanizable rubber component.

The conjugated linoleic acid contents of the various fatty acids used for ester compounds A to K described above and the viscosities of the esters were measured by a UV spectrum method and a Brookfield type rotary viscometer, respectively.

Ester compounds A to K were obtained by production methods described below. Hereinafter, "conjugated linoleic acid content" is referred to simply as "conjugated acid rate".

A: A one liter flask was charged with 364 g (1.3 mol) of dehydrated castor oil fatty acid (conjugated acid rate: 45%), 62 g (0.69 mol) of 1,4-butylene glycol, 100 ml of toluene and 0.4 g of anhydrous stannous chloride as a catalyst, and reaction was continued at 140 to 160° C. for 8 hours while removing generated water to the outside of the system. After cooling the reaction liquid to 120° C., 5 g of clay was added thereto to treat it for 10 minutes, and then it was filtered to obtain an ester compound having an acid value of 2.3 and a viscosity at 25° C. of 54 mPa·s. This ester compound had a conjugated acid rate of 43%.

B: A one liter flask was charged with 280 g (1.0 mol) of dehydrated castor oil fatty acid (conjugated acid rate: 45%), 169 g (1.3 mol) of 2-ethylhexanol, 100 ml of toluene and 0.3 g of paratoluenesulfonic acid, and reaction was continued at 140 to 160° C. for 8 hours while removing generated water to the outside of the system. After distilling toluene and excess unreacted alcohol to recover them, the residue was treated with acid clay to obtain an ester compound having an acid value of 0.7 and a viscosity at 25° C. of 14 mPa·s. This ester compound had a conjugated acid rate of 43%.

C: A one liter flask was charged with 280 g (1.0 mol) of dehydrated castor oil fatty acid (conjugated acid rate: 45%), 130 g (1.2 mol) of benzyl alcohol, 100 ml of toluene and 0.3 g of paratoluenesulfonic acid, and reaction was continued at 140 to 160° C. for 8 hours while removing generated water to the outside of the system. After distilling toluene and excess unreacted alcohol to recover them, the residue was treated with acid clay to obtain an ester compound having an acid value of 0.8 and a viscosity at 25° C. of 16 mPa·s. This ester compound had a conjugated acid rate of 44%.

D: A one liter flask was charged with 280 g (1.0 mol) of dehydrated castor oil fatty acid (conjugated acid rate: 45%), 192 g (6.0 mol) of methyl alcohol and 0.3 g of paratoluenesulfonic acid, and reaction was continued for 16 hours under reflux. After distilling the excess unreacted alcohol to recover it, the residue was distilled under reduced pressure to obtain an ester compound having an acid value of 0.3 and a viscosity at 25° C. of 7 mPa·s. This ester compound had a conjugated acid rate of 41%.

E: A one liter flask was charged with 364 g (1.3 mol) of dehydrated castor oil fatty acid (conjugated acid rate: 45%), 83 g (0.78 mol) of diethylene glycol, 100 ml of toluene and 0.4 g of anhydrous stannous chloride as a catalyst, and reaction was continued at 140 to 160° C. for 12 hours while removing generated water to the outside of the system. After cooling the reaction liquid to 120° C., 5 g of clay was added thereto to treat it for 10 minutes, and then it was filtered to obtain an ester compound having an acid value of 6.9 and a viscosity at 25° C. of 58 mPa·s. This ester compound had a conjugated acid rate of 42%.

F: A one liter flask was charged with 364 g (1.3 mol) of dehydrated castor oil fatty acid (conjugated acid rate: 45%), 59 g (0.44 mol) of trimethylolpropane, 100 ml of toluene and 0.4 g of anhydrous stannous chloride as a catalyst, and reaction was continued at 150 to 180° C. for 5 hours and then at 180 to 195° C. for 7 hours while removing generated water to the outside of the system. After cooling the reaction liquid to 120° C., 5 g of clay was added thereto to treat it for 10 minutes, and then it was filtered to obtain an ester compound (triester) having an acid value of 6.8 and a viscosity at 25° C. of 160 mPa·s. This triester compound had a conjugated acid rate of 45%.

A mixture obtained by mixing this triester compound with ester compound A in a proportion of 30:70 was used.

G: A one liter flask was charged with 364 g (1.3 mol) of dehydrated castor oil fatty acid (conjugated acid rate: 50%), 62 g (0.69 mol) of 1,4-butylene glycol, 100 ml of toluene and 0.4 g of anhydrous stannous chloride as a catalyst, and reaction was continued at 140 to 160° C. for 8 hours while removing generated water to the outside of the system. After cooling the reaction liquid to 120° C., 5 g of clay was added thereto to treat it for 10 minutes, and then it was filtered to obtain an ester compound having an acid value of 2.3 and a viscosity at 25° C. of 54 mPa·s. This ester compound had a conjugated acid rate of 48%.

H: A one liter flask was charged with 367 g (1.3 mol) of oleic acid, 62 g (0.69 mol) of 1,4-butylene glycol, 100 ml of toluene and 0.4 g of anhydrous stannous chloride as a catalyst, and reaction was continued at 140 to 160° C. for 8 hours while removing generated water to the outside of the system. After cooling the reaction liquid to 120° C., 5 g of clay was added thereto to treat it for 10 minutes, and then it was filtered to obtain an ester compound having an acid value of 2.4 and a viscosity at 25° C. of 55 mPa·s.

I: A one liter flask was charged with 282 g (1.0 mol) of oleic acid, 169 g (1.3 mol) of 2-ethylhexanol, 100 ml of toluene and 0.3 g of paratoluenesulfonic acid, and reaction was continued at 140 to 160° C. for 8 hours while removing generated water to the outside of the system. After distilling toluene and the excess unreacted alcohol to recover them, the residue was treated with acid clay to obtain an ester compound having an acid value of 0.8 and a viscosity at 25° C. of 16 mPa·s.

J: A one liter flask was charged with 282 g (1.0 mol) of oleic acid, 130 g (1.2 mol) of benzyl alcohol, 100 ml of toluene and 0.3 g of paratoluenesulfonic acid, and reaction was continued at 140 to 160° C. for 8 hours while removing generated water to the outside of the system. After distilling toluene and the excess unreacted alcohol to recover them, the residue was treated with acid clay to obtain an ester compound having an acid value of 0.9 and a viscosity at 25° C. of 18 mPa·s.

K: A one liter flask was charged with 364 g (1.3 mol) of dehydrated castor oil fatty acid (conjugated acid rate: 35%), 62 g (0.69 mol) of 1,4-butylene glycol, 100 ml of toluene and 0.4 g of anhydrous stannous chloride as a catalyst, and reaction was continued at 140 to 160° C. for 8 hours while removing generated water to the outside of the system. After cooling the reaction liquid to 120° C., 5 g of clay was added thereto to treat it for 10 minutes, and then it was filtered to obtain an ester compound having an acid value of 2.4 and a viscosity at 25° C. of 55 mPa·s. This ester compound had a conjugated acid rate of 33%.

The rubber compositions obtained in Examples 1 to 18 and comparative Examples 1 to 12 were evaluated for physical properties of the unvulcanized state in terms of a Mooney viscosity, and the vulcanized state in terms of a heat-generating property (resilience) and tensile strength ($T_B$). The adhesive property between a steel cord and vulcanized rubber was evaluated by an index which was derived from a peel-off strength obtained by a steel cord·peel off test. These results are shown in the following Table 1 and Table 2.

The Mooney viscosity, the heat-generating property (resilience), the tensile strength ($T_B$) and the steel cord·peel off test were evaluated by the following standards, respectively. Vulcanization was carried out at 145° C. for 30 minutes.

(1) Evaluation Method of Mooney Viscosity

The Mooney viscosity ($ML_{1+4}$, 130° C.) was determined according to JIS K6300-1994. It is shown that the lower the value, the better the processability in the unvulcanized state.

(2) Evaluation Method of Heat-generating Property (Resilience)

The resilience was determined at room temperature (25° C.) according to the rebound resilience test prescribed in JIS K6301-1995. It is shown that the higher the value is, the better the low heat-generating property is.

(3) Evaluation Method of Tensile Strength ($T_B$)

The tensile strength was determined at room temperature (25° C.) according to the tensile test prescribed in JIS K6301-1995. It is shown that the higher the value is, the better the tensile strength is.

(4) Evaluation Method of Steel Cord·peel Off Test (Adhesive Property)

With regard to an adhesive property between a steel cord and vulcanized rubber, a peel-off strength (peeling strength) between a steel cord and vulcanized rubber was determined by peeling off the steel cord after embedding the steel cord in the unvulcanized rubber composition to vulcanize at 145° C. for 45 minutes, and then aging it in a constant temperature bath of 100° C. for 7 days.

The values were shown by indexes wherein the value of Comparative Example 1 or Comparative Example 7 was set at 100. It is shown that the higher the value is, the better the adhesive property is.

The kinds of the processing acids in the above table are shown below:

A: An ester compound of dehydrated castor oil fatty acid having a conjugated linoleic acid content of 45% with 1,4-butylene glycol B: An ester compound of dehydrated castor oil fatty acid having a conjugated linoleic acid content of 45% with 2-ethylhexanol C: An ester compound of dehydrated castor oil fatty acid having a conjugated linoleic acid content of 45% with benzyl alcohol D: An ester compound of dehydrated castor oil fatty acid having a conjugated linoleic acid content of 45% with methyl alcohol E: An ester compound of dehydrated castor oil fatty acid having a conjugated linoleic acid content of 45% with diethylene glycol F: A mixture of ester compounds of dehydrated castor oil fatty acid having a conjugated linoleic acid content of 45% with trimethylolpropane or 1,4-butylene glycol (30% by weight/70% by weight)

G: An ester compound of dehydrated castor oil fatty acid having a conjugated linoleic acid content of 50% with 1,4-butylene glycol H: An ester compound of oleic acid with 1,4-butylene glycol I: An ester compound of oleic acid with 2-ethylhexanol J: An ester compound of oleic acid with benzyl alcohol K: An ester compound of dehydrated castor oil fatty acid having a conjugated linoleic acid content of 35% with 1,4-butylene glycol TBBS: N-t-butyl-2-benzothiazolyl sulfenamide

TABLE 1

(blend unit: parts by weight)

| | Comparative Example 1 | Example 1 | 2 | 3 | 4 | 5 | 6 | 7 | 8 | 9 | Comparative Example 2 | 3 | 4 | 5 | 6 |
|---|---|---|---|---|---|---|---|---|---|---|---|---|---|---|---|
| Natural rubber | 60 | 60 | 60 | 60 | 60 | 60 | 60 | 60 | 60 | 60 | 60 | 60 | 60 | 60 | 60 |
| Polybutadiene rubber | 40 | 40 | 40 | 40 | 40 | 40 | 40 | 40 | 40 | 40 | 40 | 40 | 40 | 40 | 40 |
| Carbon black (HAF) | 75 | 75 | 75 | 75 | 75 | 75 | 75 | 75 | 75 | 75 | 75 | 75 | 75 | 75 | 75 |
| Process oil | 2 | 2 | 2 | 2 | 2 | 2 | 2 | 2 | 2 | 2 | 2 | 2 | 2 | 2 | 2 |
| Stearic acid | 1 | 1 | 1 | 1 | 1 | 1 | 1 | 1 | 1 | 1 | 1 | 1 | 1 | 1 | |
| Processing aid | | | | | | | | | | | | | | | |
| Kind | None | A | B | C | D | E | F | G | A | A | H | I | J | K | A |
| Added amount | 0 | 2 | 2 | 2 | 2 | 2 | 2 | 2 | 0.5 | 5 | 2 | 2 | 2 | 2 | 0.1 |
| Zinc oxide | 5 | 5 | 5 | 5 | 5 | 5 | 5 | 5 | 5 | 5 | 5 | 5 | 5 | 5 | 5 |
| Vulcanization accelerator (TBBS) | 1 | 1 | 1 | 1 | 1 | 1 | 1 | 1 | 1 | 1 | 1 | 1 | 1 | 1 | 1 |
| Insoluble sulfur | 4 | 4 | 4 | 4 | 4 | 4 | 4 | 4 | 4 | 4 | 4 | 4 | 4 | 4 | 4 |
| Processability ($ML_{1+4}$) | 85 | 72 | 72 | 72 | 70 | 73 | 76 | 72 | 77 | 67 | 75 | 75 | 75 | 72 | 83 |
| Heat-generating property (resilience) | 58.0 | 58.2 | 58.3 | 58.4 | 57.9 | 59.0 | 58.4 | 58.2 | 58.4 | 58.1 | 57.4 | 57.6 | 57.4 | 57.8 | 58.0 |
| Strength (TB, MPa) | 17.0 | 17.2 | 17.3 | 17.1 | 16.9 | 17.4 | 17.0 | 17.6 | 17.2 | 17.2 | 15.9 | 16.0 | 16.2 | 16.5 | 17.0 |

TABLE 2

| | Comparative Example 7 | Example 10 | 11 | 12 | 13 | 14 | 15 | 16 | 17 | 18 | Comparative Example 8 | 9 | 10 | 11 | 12 |
|---|---|---|---|---|---|---|---|---|---|---|---|---|---|---|---|
| | | | | | | | | | | (blend unit: parts by weight) | | | | | |
| Natural rubber | 100 | 100 | 100 | 100 | 100 | 100 | 100 | 100 | 100 | 100 | 100 | 100 | 100 | 100 | 100 |
| Carbon black (HAF) | 50 | 50 | 50 | 50 | 50 | 50 | 50 | 50 | 50 | 50 | 50 | 50 | 50 | 50 | 50 |
| Adhesive | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Antioxidant (6PPD) | 2 | 2 | 2 | 2 | 2 | 2 | 2 | 2 | 2 | 2 | 2 | 2 | 2 | 2 | 2 |
| Processing aid | | | | | | | | | | | | | | | |
| Kind | None | A | B | C | D | E | F | G | A | A | H | I | J | K | A |
| Added amount | 0 | 2 | 2 | 2 | 2 | 2 | 2 | 2 | 0.5 | 5 | 2 | 2 | 2 | 2 | 0.1 |
| Zinc oxide | 8 | 8 | 8 | 8 | 8 | 8 | 8 | 8 | 8 | 8 | 8 | 8 | 8 | 8 | 8 |
| Vulcanization accelerator (DCBS) | 1 | 1 | 1 | 1 | 1 | 1 | 1 | 1 | 1 | 1 | 1 | 1 | 1 | 1 | 1 |
| Insoluble sulfur | 5 | 5 | 5 | 5 | 5 | 5 | 5 | 5 | 5 | 5 | 5 | 5 | 5 | 5 | 5 |
| Processability ($ML_{1+4}$) | 70 | 57 | 57 | 57 | 55 | 58 | 61 | 57 | 62 | 53 | 60 | 60 | 60 | 67 | 68 |
| Heat-generating property (resilience) | 66.2 | 66.2 | 66.3 | 66.0 | 65.9 | 66.0 | 66.0 | 66.4 | 66.0 | 66.1 | 63.9 | 63.5 | 64.1 | 65.5 | 66.0 |
| Strength (TB, Mpa) | 19.8 | 19.9 | 20.0 | 19.6 | 19.7 | 19.6 | 20.0 | 20.1 | 20.0 | 20.3 | 18.6 | 17.9 | 18.0 | 18.9 | 19.7 |
| Adhesive property (index) | 100 | 99 | 101 | 101 | 102 | 100 | 102 | 106 | 100 | 100 | 84 | 86 | 85 | 94 | 99 |

The kinds of the processing acids in the above table are shown below:

A: An ester compound of dehydrated castor oil fatty acid having a conjugated linoleic acid content of 45% with 1,4-butylene glycol B: An ester compound of dehydrated castor oil fatty acid having a conjugated linoleic acid content of 45% with 2-ethylhexanol C: An ester compound of dehydrated castor oil fatty acid having a conjugated linoleic acid content of 45% with benzyl alcohol D: An ester compound of dehydrated castor oil fatty acid having a conjugated linoleic acid content of 45% with methyl alcohol E: An ester compound of dehydrated castor oil fatty acid having a conjugated linoleic acid content of 45% with diethylene glycol F: A mixture of ester compound of dehydrated castor oil fatty acid having a conjugated linoleic acid content of 45% with trimethylolpropane or 1,4-butylene glycol (30% by weight/70% by weight)

G: An ester compound of dehydrated castor oil fatty acid having a conjugated linoleic acid content of 50% with 1,4-butylene glycol H: An ester compound of oleic acid with 1,4-butylene glycol I: An ester compound of oleic acid with 2-ethylhexanol J: An ester compound of oleic acid with benzyl alcohol K: An ester compound of dehydrated castor oil fatty acid having a conjugated linoleic acid content of 35% with 1,4-butylene glycol Adhesive: Manhood C22.5 manufactured by Rhone Poulenc Co., Ltd.

6PPD: N-(1,3-dimethylbutyl)-N'-phenyl-p-phenylenediamine

DCBS: N,N-dicyclohexyl-2-benzothiazolyl sulfenamide

Comments on Table 1 and Table 2

As apparent from the results shown in Table 1 and Table 2 described above, it has been found that the rubber compositions in Examples 1 to 9 falling in the scope of the present invention is markedly excellent in the processability in the unvulcanized state and have the excellent low heat-generating property without deteriorating the mechanical property (tensile strength) after vulcanization as compared with those in Comparative Examples 1 to 6 falling outside the scope of the present invention, and that in Examples 10 to 18, the adhesion between steel and vulcanized rubber is excellent as compared with those in Comparative Examples 7 to 12 falling outside the scope of the present invention.

To specifically observe the examples, Examples 1 to 9 are cases where the ester compounds obtained by a reaction of various fatty acids having a conjugated linoleic acid content of 40% by weight or more with various alcohols are blended in the blending amounts falling in the scope of the present invention respectively with 100 parts by weight of the rubber component comprising natural rubber and polybutadiene rubber. Particularly in Example 9, the blending amount of the ester compound is set to 5 parts by weight, and this is a case where the amount is increased by 2.5 times based on that of Example 1 and by 10 times based on that of Example 8. It can be found that also in this case, the processability is further improved without deteriorating the mechanical property and the low heat-generating property after vulcanization. It has been confirmed that the rubber compositions prepared in Examples 1 to 9 can suitably be used for tread rubber of a tire.

On the other hand, Examples 10 to 18 are cases where the ester compounds obtained by a reaction of various fatty acids having a conjugated linoleic acid content of 40% by weight or more with various alcohols are blended in the blending amounts falling in the scope of the present invention respectively with 100 parts by weight of the rubber component comprising natural rubber and where an adhesive (Manobond C22.5 manufactured by Rhone Poulenc Co., Ltd.) is further blended. Particularly in Example 18, the blending amount of the ester compound is set to 5 parts by weight, and this is a case where the amount is increased by 2.5 times based on that of Example 10 and by 10 times based on that of Example 17. It can be found that also in this case, the processability is further improved without deteriorating the mechanical property and the low heat-generating property after vulcanization and the adhesion between steel and vulcanized rubber.

In contrast with this, to specifically observe the comparative examples falling outside the scope of the present, the compositions are blended based on 100 parts by weight of the rubber component comprising natural rubber and polybutadiene rubber in Comparative Examples 1 to 6 and based on 100 parts by weight of the rubber component comprising natural rubber in Comparative Examples 7 to 12. Comparative Examples 1 and 7 are cases (controls) where the ester compound according to the present invention is not blended; Comparative Examples 2 to 4 and Comparative Examples 8 to 10 are cases where the ester compounds obtained by reacting oleic acid with various alcohols are blended: Comparative Examples 5 and 11 are cases where the ester compounds obtained by reacting a fatty acid (dehydrated castor oil fatty acid) having a conjugated linoleic acid content of 33% by weight, which is less than 40% by weight, with various alcohols are blended; and Comparative Examples 6 and 12 are cases where the ester compounds obtained by reacting a fatty acid having a conjugated linoleic acid content of 40% by weight or more with various alcohols are blended but the blending amount thereof is 0.1 part by weight, which is less than 0.2 part by weight. It can be found that in any of the cases of these Comparative Examples 1 and 12, the effects of the present invention can not be exerted.

What is claimed is:

1. A rubber composition characterized by containing, per 100 parts by weight of a vulcanizable rubber component, 0.2 to 20 parts by weight of ester compounds obtained by a reaction of alcohols with fatty acids having a conjugated linoleic acid content of 40% by weight or more based on the total amount of the fatty acids.

2. The rubber composition as described in claim 1, wherein monohydric alcohol and/or dihydric alcohol account for 60% by weight or more of the alcohols.

3. The rubber composition as described in claim 1, wherein the ester compound has a viscosity of 140 mPa·s or less at 25° C.

4. The rubber composition as described in claim 2, wherein the ester compound has a viscosity of 140 mPa·s or less at 25° C.

* * * * *